(12) United States Patent
Miyake et al.

(10) Patent No.: US 7,352,556 B2
(45) Date of Patent: Apr. 1, 2008

(54) CHARGING METHOD FOR SQUIB

(75) Inventors: Etsuya Miyake, Saitama (JP); Hiromi Aida, Saitama (JP); Kazuo Matsuda, Saitama (JP); Junichi Nishimura, Saitama (JP); Kazutaka Saito, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 383 days.

(21) Appl. No.: 11/044,416

(22) Filed: Jan. 27, 2005

(65) Prior Publication Data
US 2005/0252404 A1    Nov. 17, 2005

(30) Foreign Application Priority Data
Feb. 4, 2004    (JP) ............... 2004-028090

(51) Int. Cl.
*F23Q 3/00* (2006.01)
(52) U.S. Cl. .................................... 361/247
(58) Field of Classification Search ............... 361/247, 361/249
See application file for complete search history.

(56) References Cited

U.S. PATENT DOCUMENTS

| | | | | |
|---|---|---|---|---|
| 4,481,857 A | * | 11/1984 | Havener ............... | 84/454 |
| 6,072,246 A | | 6/2000 | Schafer | |
| 6,127,810 A | * | 10/2000 | Sato et al. ............... | 320/148 |
| 6,281,661 B2 | * | 8/2001 | Kaite et al. ............... | 320/116 |
| 6,418,853 B1 | * | 7/2002 | Duguet et al. ............... | 102/206 |
| 6,477,457 B1 | | 11/2002 | Fendt et al. | |
| 2002/0135381 A1 | | 9/2002 | Hovet et al. | |
| 2003/0040860 A1 | | 2/2003 | Zelger | |

FOREIGN PATENT DOCUMENTS

| | | | |
|---|---|---|---|
| EP | 0 834 813 A | | 4/1998 |
| JP | 10-76912 | | 3/1998 |
| JP | 10-154992 A | | 6/1998 |
| JP | 2000-241098 A | | 9/2000 |
| JP | 2002-509834 | | 4/2002 |
| JP | 2004-231110 | | 8/2004 |
| JP | 2004364419 | * | 12/2004 |
| WO | WO 0144021 A | | 6/2001 |

* cited by examiner

*Primary Examiner*—Michael Sherry
*Assistant Examiner*—Christopher J Clark
(74) *Attorney, Agent, or Firm*—Carrier, Blackman and Associates, P.C.; Joseph P. Carrier; Wiliam D. Blackman

(57) ABSTRACT

A charging method for a plurality of squibs which charges up each storage device built in or attached to each squib which is connected to an ignition control device via a common bus, and can be selectively operated by electrical energy and electrical signals which are supplied from the ignition control device, in which, in the case of charging each storage device, the ignition control device carries out a direction of charging initiation, an electric power supply for charging, and a direction of charging stop for each storage device successively, thereby the charging for all storage devices is completed.

16 Claims, 3 Drawing Sheets

CHARGING METHOD FOR SQUIB

BACKGROUND OF THE INVENTION

1. Field of the Invention

The present invention relates to a charging method for a plurality of squibs which charge storage devices built or attached to the squibs which are connected to an ignition control device via a common bus, and can be selectively operated by electrical energy and an electrical signal which are supplied from the ignition control device.

Priority is claimed on Japanese Patent Application No. 2004-028090, filed Feb. 4, 2004, the content of which is incorporated herein by reference.

2. Description of Related Art

In an occupant restraint system used at the time of a collision as exemplified by an air bag device, a gas is produced by combustion of the propellant mainly built in an occupant restraint system as high pressure gas which is used.

Moreover, an ignition element which plays a role in igniting the propellant is also built in the occupant restraint system with the propellant.

Each ignition element and an ignition control device which controls the ignition element is connected one-to-one via a harness.

However, there is a problem in that the number of ignition elements also increases by increasing the number of occupant restraint systems using the propellant mounted in a car, the number of harnesses increase in accordance with the increase of the number of the occupant restraint systems, and the need to remodel the ignition control device may arise.

On the other hand, there has been proposed a technology in which a plurality of squibs in which are built the ignition elements, ignition circuits which operate the ignition elements, and a communication circuit which is required in the case of communicating with the ignition control device are connected to a common bus extended from the ignition control device, and electric power is supplied from the ignition control device to all the squibs, while the ignition control device supplies the electrical signal only to a predetermined squib and ignites the ignition element (Patent Document 1: Japanese Unexamined Patent Application, First Publication No. H10-154992; Patent Document 2: Japanese Unexamined Patent Application, First Publication No. 2000-241098).

Moreover, a squib which includes the communication circuit required in the case of communicating with the ignition control device via the bus, and the ignition circuit which operates the ignition element is proposed (Patent Document 2).

Furthermore, a technology which enables connecting the existing occupant restraint system with a bus without any changes by building an IC which holds the communication circuit, the ignition circuit, and the ignition element within a squib having a conventional external shape without modifying the existing occupant restraint system is being examined.

Furthermore, regarding the squib which builds or attaches the circuit for connecting the bus transmitting electric power and a data signal such as the squib attaching the communication circuit and the ignition circuit according to Patent Document 2, as an energy source which heats the ignition element and ignites the squib, a technique of accumulating electric power obtained from the ignition control device to the storage devices, such as condensers, via the bus is proposed.

In this way, in the state in which sufficient electric power is accumulated in the storage device, electric power which should be supplied from a bus to the storage device can be held down to a level required for supplementing the electric charge lost in natural electric discharge and the like.

However, when there are many squibs connected to the bus, the storage devices for supplying ignition energy which are built or attached the squibs also increase in proportional to the number of the squibs, but the amount of electric power from the bus is usually small.

For this reason, after the ignition control device begins to operate, it is necessary for a special charging technique to be used, and each storage device is charged to some degree in advance so that charging can be completed in a short time in preparation for a collision.

However, when the constitution in which, in the state of connecting a plurality of squibs to the bus, each storage device charges by drawing charging electrical current simultaneously from a bus is adapted, the failure of the bus itself or the ignition control device which supplies electrical current may arise when the input of electrical current is excessive.

Therefore, in order to prevent the above problem, a new electrical current restriction element or new electrical current restriction circuit should be introduced, and thereby the number of parts is increased, while the cost increases.

Moreover, when the constitution of performing the restriction of electrical current by resistance at the side of the ignition control device or each squib in order to suppress the total amount of input current at the time of starting charging is adopted, thereinafter, a large quantity (that is, a degree that a problem arises in the case of drawing electrical current to all squibs simultaneously) of electrical current cannot be drawn in each squib.

As a countermeasure therefor, a technique of performing restriction of electrical current with high resistance value only at the time of the initial charge has been considered. However, even if such a technique is used, when the total amount (the total capacity) of the storage devices increases or decreases, as the case may be, the ignition control device must change the amount of electrical current at the time of the initial charging.

In such a case, there is a problem in that an advantage of using the bus which does not need circuit change of the ignition control device is lost.

On the other hand, when the storage device acts as an ignition energy supply source in the squib, it is indispensable to diagnose the final initial charge and the fact of being a necessary and sufficient capacity by using a certain means.

In contrast, the adoption of a constitution of setting a diagnostic circuit in each storage device which is built in or attached to each squib connected to the bus has been considered.

However, it is important and necessary for the ignition control device to ultimately be able to comprehend a diagnostic result.

For this reason, when a complicated circuit or a complicated technique for each diagnosis itself is not required, the circuit and the communication protocol for transmitting the diagnostic result to the ignition control device by communication is required, and thereby there is a problem of increase in communication specifications or cost.

SUMMARY OF THE INVENTION

The objects of the present invention are to provide an ignition method for squibs in which the amount of initial charge electrical current for the storage device can be regulated regardless of increase and decrease in the number of squibs, and in which reliability can be enhanced.

In order to solve the above problems, the present invention adopted the following means.

According to one aspect of the present invention there is provided a charging method for a plurality of squibs which charges each storage device built in or attached to each squib which is connected to an ignition control device via a common bus, and can be selectively operated by electrical energy and electrical signal which are supplied from the ignition control device, in which, in the case of charging each storage device, the ignition control device carries out a direction of charging initiation, an electric power supply for charging, and a direction of charging stop for each storage device successively, and thereby the charging for all storage devices is completed.

According to the present invention, the amount of initial charge electrical current for the storage device can be regulated regardless of increase or decrease in the number of squibs which the storage device is built in or attached to, and a safe design for preventing the initial charge electrical current from operating as input electrical current can be easily conducted.

Moreover, because an electrical current limitation circuit in the ignition control device does not need to modify specifications regardless of increase and decrease in the number of the squibs, a primary advantage of using the bus can be derived, and an increase of cost due to the increase of the useless specifications can be avoided.

In the present invention, when the ignition control device transmits an electrical signal which implies an ignition initiation to a charging control circuit for the storage device in each squib via the bus, a path which draws electrical current from the bus to the storage device of the squib is formed, and an initial charging of the storage device may be initiated using electrical power provided from the ignition control device.

According to the present invention, when the charging initiation is detected, the path which makes it possible to charge quickly is formed, and thereby rapid and safe charging can be conducted.

In the present invention, in the case in which electrical power for the initiation charging of each storage device is supplied, the ignition control device monitors the electrical current which is consumed by the bus, and when an electrical current value thereof conforms with the electrical current value of the electrical current which is consumed by the bus before the charging operation is initiated, a supply of electrical power for the squib is completed, the time taken for completion of charging is sought, and the ignition control device may judge the capacity of each storage device by computing the capacity from the charging time using a time constant of the storage device.

According to the present invention, the capacity of each storage device can be judged accurately, and the ignition control device is able to comprehend a diagnostic result ultimately without an increase in the communication specifications or cost.

In the present invention, in the case in which electrical power for an initiation charging of each storage device is supplied, a charging control circuit for the storage device in each squib monitors electrical current which is consumed by the bus, and when an electrical current value thereof conforms with the electrical current value of the storage device before the charging operation is initiated, a completion of charging is detected and is notified to the ignition control device, the time taken for completion of charging is sought, and the charging control circuit for the storage device in each squib may judge the capacity of each storage device by computing the capacity from the charging time using a time constant of the storage device.

According to the present invention, the capacity of each storage device can be judged accurately, and the ignition control device is able to comprehend a diagnostic result ultimately without an increase in the communication specifications or cost.

In the present invention, when each electrical signal which implies completion of charging of each storage device is transmitted to the ignition control device via the bus, a completion of charging of each storage device is detected by the ignition control device, while when the ignition control device detects the completion of charging of each storage device, a path which draws in electrical current from the bus to the storage device is blocked, and thereby the initial charging is finished, and a supplement charge from the bus may be conducted.

According to the present invention, because the ignition control device can directly diagnose the capacity of each storage device, the cost for providing the capacity diagnosis circuit at the side of the storage device or the need to transmit a diagnosis result due to the communication and the like will not occur.

Moreover, a diagnosis of short breakdown in addition to a capacity diagnosis can be conducted.

In the present invention, in the case in which electrical power for the initiation of charging of each storage device is supplied, the ignition control device monitors electrical current which is consumed by the bus, and when an electrical current value thereof conforms with the electrical current value of the electrical current which is consumed by the bus before a charging operation is initiated, a completion of charging is detected, when a path which draws in electrical current from the bus to the storage device is blocked, the initial charging is finished, and a supplement charge from the bus may be conducted.

According to the invention, because the ignition control device can directly diagnose the capacity of each storage device, the cost for providing a capacity diagnosis circuit at the side of the storage device or for causing a need to transmit a diagnosis result due to the communication and the like will not occur.

Moreover, a diagnosis of short breakdown in addition to a capacity diagnosis can be conducted.

DETAILED DESCRIPTION OF THE INVENTION

The squib according to the preferred embodiment of the present invention will be explained with reference to the figures.

Figure 1:
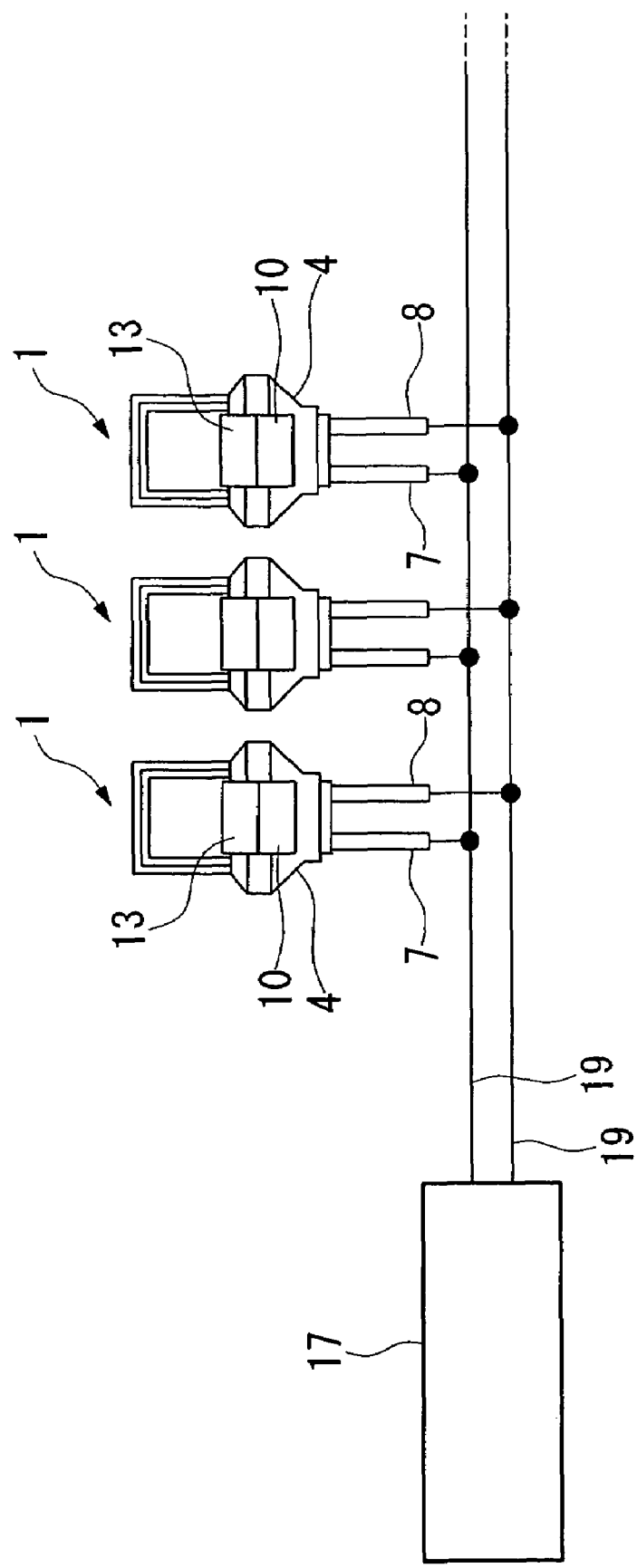
FIG. 1 is a schematic diagram of a deployment control system which has a plurality of squibs according to a preferred embodiment of the present invention.

FIG. 1 is a schematic diagram of a deployment control system of the squibs which are included in an air bag device according to an embodiment of the present invention.

As shown in FIG. 1, the ignition control device 17 and a plurality of squibs 1,1 are connected via the bus 19.

The ignition control device 17 is a control device which is a center of an occupant protection apparatus which protects an occupant from an impact on a vehicle.

Each squib 1 is provided to a plurality of assistant restriction apparatus (not shown in the drawings) one-to-one which is positioned at the proper place of the vehicle in order to protect the occupant, and is connected in parallel using the unbalanced type of bus 19, for example in which one of a pair of wire rods is grounded.

Moreover, each squib 1 has built therein-therewith a communication control circuit 10, a condenser 13 which is the storage device, a heat producing portion which is the ignition element, and the ignition agent at the upper portion of a header 4 which includes pins 7 and 8 which are connection terminals provided in order to connect with two lines type of bus line which is the external signal wire.

Figure 2:
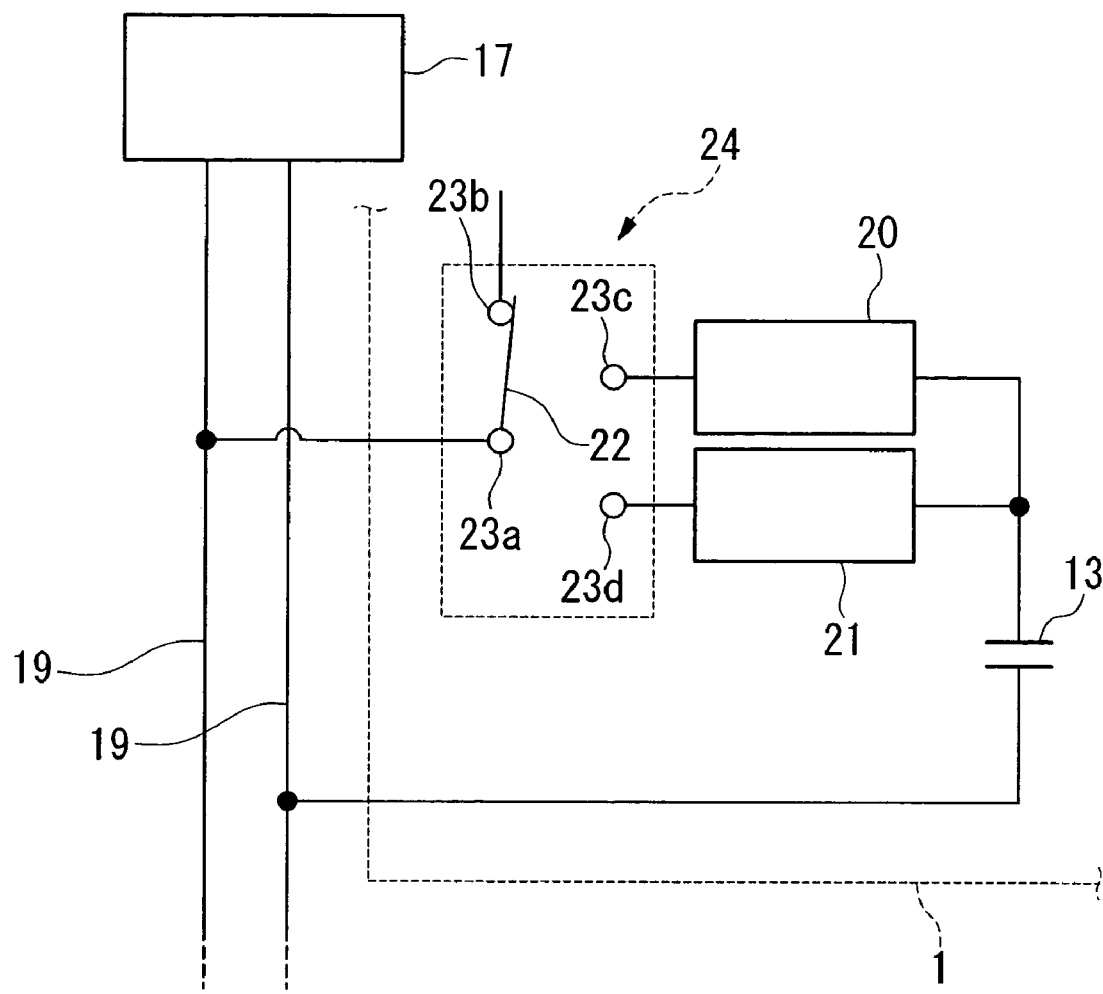
FIG. 2 is a block diagram showing a circuit structure of the squib shown in FIG. 1.

A circuit structure of each squib 1 is explained referring to FIG. 2.

As shown in FIG. 2, each squib 1 is provided with an initial charging circuit 20 and a stationary charging circuit 21 in addition to the condenser 13. These charging circuits 20 and 21 are connected to the bus 19 via a switching means 24.

The switching means 24 is provided with a terminal 23a connected to the bus 19, a terminal 23b connected to the terminals except the charging circuits 20 and 21, a terminal 23c connected to the initial charging circuit 20, a terminal 23d connected to the stationary charging circuit 21, and a switch 22 which is rotatably connected to the terminal 23a, and is able to connect to the terminals 23b-23d, selectively.

A resistance component of the initial charging circuit 20 is set up lower than the resistance component of the stationary charging circuit 21, and the initial charging circuit 20 can perform the charging in a shorter time than the stationary charging circuit 21.

Furthermore, when the switch 22 connected to the terminal 23a is connected with the terminal 23b, the path (the path A) which does not charge to the condenser 13 is thereby formed.

Moreover, when the switch 22 is connected to the terminal 23c, the path (path B) which performs the initial charging to the condenser 13 is thereby formed.

Furthermore, when the switch 22 is connected to the terminal 23d, the path (the path C) which performs the stationary charging to the condenser 13 is thereby formed.

The charging method for each squib constituted as such is explained.

In an initial state, the switch 22 of each squib 1 is connected to the terminal 23b, and thereby, the path A which is indifferent to the charging is formed.

Then, a charging process is performed for each squib successively using the ignition control device 17.

Thereafter, an example of one squib 1 among each squib 1 is explained.

First of all, the ignition control device 17 transmits an electrical signal which implies the charging initiation to the control circuit 10 of the squib 1 which is an object of the charging process via the bus 19.

Thereby, the switch 22 of the squib 1 is switched from the terminal 23b to the terminal 23c, and the path B which performs the initiation charging is formed.

Then, the initial charging is started for the condenser 13 of the squib 1.

At this time, the ignition control device 17 monitors electrical current consumed by the bus 19, and conducts the capacity diagnosis of the condenser 13.

Figure 3:
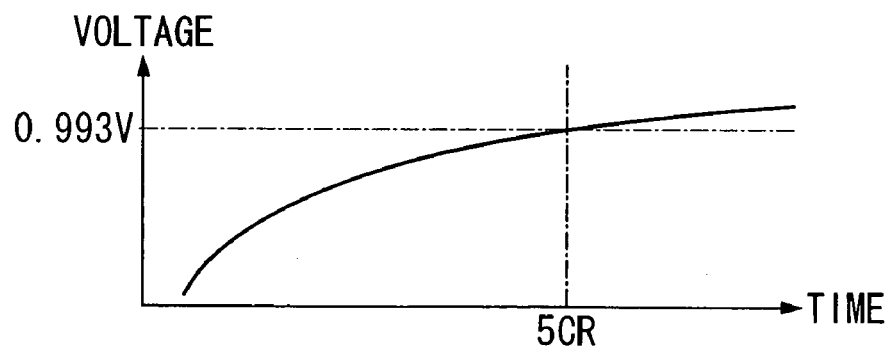
FIG. 3 is a graphical view showing a relationship between time and voltage at the time of initial charging of each squib.
Figure 4:
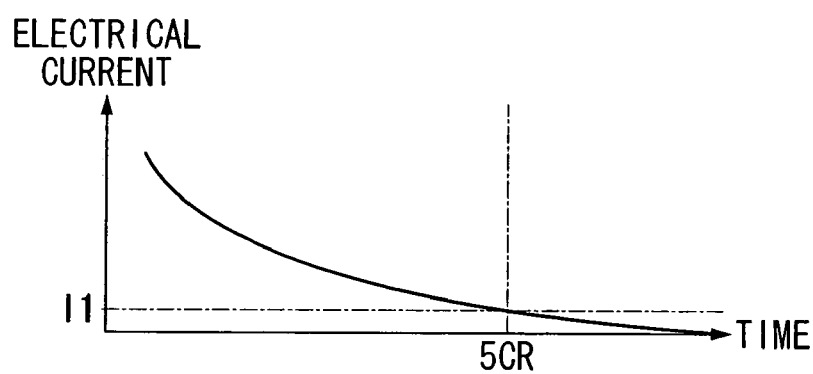
FIG. 4 is a graphical view showing a relationship between time and electric current at the time of initial charging of each squib.

This is concretely explained referring to FIG. 3 and FIG. 4.

The capacity of the condenser 13 is represented by "C", a sum of the charging path for the condenser 13 and the internal resistance of the condenser 13 is represented by "R", a time when a charging electrical potential "Vc" of the condenser 13 in the case that a charging electrical pressure is "V" becomes about 0.993 V is represented by "5CR". The ignition control device 17 can calculate a value of "C" from a time of "5CR" by previously measuring "R" and a potential difference at this time.

That is, when a value of electrical current which is transmitted to the condenser 13 conforms with the electrical current value of the electrical current which is consumed by the bus 19 before the charging operation is initiated, the completion of charging is detected, the time taken for a completion of charging is sought, and the ignition control device judges a capacity of each condenser 13 by computing the capacity from the charging time using a time constant of the condenser 13.

Thereby, the capacity of each condenser 13 can be judged accurately, the ignition control device is able to comprehend a diagnostic result ultimately without an increase in the communication specifications or cost.

Thus, when the ignition control device 17 which conducted the capacity diagnosis of the condenser 13 judges the completion of charging of the condenser 13, the connection of switch 22 is switched from the terminal 23c to the terminal 23d by the electrical signal, and the path C is formed.

Thereby, for the condenser 13 to which the initial charging is finished, a small quantity of invariable electrical current is drawn in the stationary charging circuit 21 from the bus 19.

Furthermore, the process as mentioned above is performed for each condenser 13 of each squib 1, successively.

That is, a performance that after the initial charging for a condenser 13 of one squib 1 is finished, the initial charging for a condenser 13 of the other squib 1 begins is conducted, successively.

By conducting the above operation, finally, the paths C which conduct the stationary charging are formed for all squibs 1.

As mentioned above, because in the case of charging each condenser 13, the ignition control device 17 conducts the supply of electrical current for charging to each condenser 13 successively, thereby the charging for all condensers 13 is finished, the amount of initial charge electrical current for the condenser 13 can be regulated regardless of an increase and a decrease of the number of squibs 1, and a safe design for preventing the initial charge electrical current from operating as input electrical current can be easily conducted.

Moreover, as a result of an electrical current limitation circuit in the ignition control device 17 not being necessary to modify specifications regardless of an increase and a decrease in the number of the squibs 1, a primary advantage of using the bus can be derived, and an increase in cost due to an increase in useless specifications can be avoided.

Furthermore, when the charging initiation is detected, the path which makes it possible to charge quickly is formed, thereby rapid and safe charging can be conducted.

In addition, because the ignition control device 17 can directly diagnose a capacity of each condenser 13, the cost for providing a capacity diagnosis circuit at the side of the condenser 13 or for causing the need to transmit diagnosis results due to the communication and the like is not necessary.

Moreover, a diagnosis of short breakdown in addition to a capacity diagnosis of the condenser 13 can be conducted.

In addition, a content of the present invention is not limited to the embodiment as mentioned above.

For example, it is not necessary to use the condenser 13 as the storage device. Other storage devices such as a battery and the like may be used.

Figure 5:
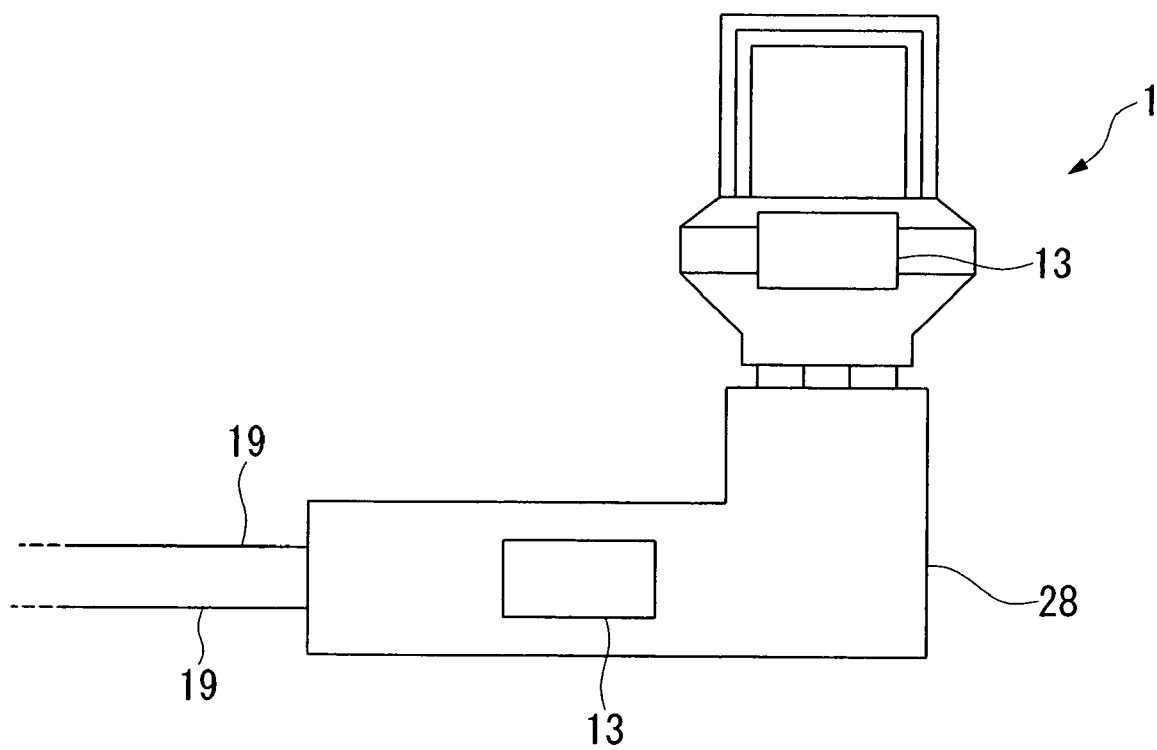
FIG. 5 is a diagram showing modification of the squib.

Moreover, the condenser 13 does not need to be built in the squib 1, and may be attached to the squib 1 via the connecter 28 as shown FIG. 5.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A method for charging any multiple number of squibs connected to a common bus, each squib including a storage device and being connected to a common ignition control device via the bus, and wherein each squib is selectively operated by electrical energy and electrical signals from the ignition control device, the method comprising the steps of:

operating the ignition control device to carry out a direction of charging initiation, an electric power supply for charging, and a direction of charging stop for each storage device successively until the charging for all storage devices is completed; wherein each squib further includes an initial charging circuit and a stationary charging circuit connected to the bus via a switch which is switched by a signal from the ignition control device; and determining a charged condition of the storage device of each squib solely based on current level in said bus.

2. A charging method for a plurality of squibs according to claim 1, wherein when the ignition control device transmits an electrical signal which implies an ignition initiation to the initial charging circuit for the storage device in each squib via the bus, a path which draws in electrical current from the bus to the storage device of the squib is formed, and an initial charging of the storage device is initiated using electrical power provided from the ignition control device.

3. A charging method for a plurality of squibs according to claim 1, wherein when electrical power for the charging initiation of each storage device is supplied, the ignition control device monitors electrical current which is consumed by the bus, and when an electrical current value thereof conforms with an electrical current value of the electrical current which is consumed by the bus before the charging operation is initiated, a supply of electrical power for the storage device is determined to be completed, the time taken for a completion of charging is calculated, and the ignition control device determines a capacity of each storage device by computing the capacity from the charging time using a time constant of the storage device.

4. A charging method for a plurality of squibs according to claim 1, wherein when electrical power for a charging initiation of each storage device is supplied, a charging control circuit for the storage device in each squib monitors electrical current which is consumed by the bus, when an electrical current value thereof conforms with an electrical current value of the storage device before the charging operation is initiated, a completion of charging is detected and is notified to the ignition control device, the time taken for completion of charging is calculated, and the charging control circuit for the storage device in each squib determines the capacity of each storage device by computing the capacity from the charging time using a time constant of the storage device.

5. A charging method for a plurality of squibs according to claim 1, wherein when each electrical signal which implies a completion of charging of each storage device is transmitted to the ignition control device via the bus, a completion of initial charging of each storage device is detected by the ignition control device, while when the ignition control device detects the completion of initial charging of each storage device, a path which draws in electrical current from the bus to the storage device is blocked, thereby the initial charging is completed, and a supplemental charge from the bus is conducted by switching the switch from the initial charging circuit to the stationary charging circuit.

6. A charging method for a plurality of squibs according to claim 1, wherein when electrical power for the charging initiation of each storage device is supplied, the ignition control device monitors electrical current which is consumed by the bus, and when an electrical current value thereof conforms with the electrical current value of an electrical current which is consumed by the bus before a charging operation is initiated, a completion of charging is detected, and thereafter a path which draws in electrical current from the bus to the storage device is blocked when the initial charging is finished and a supplemental charge from the bus is conducted by switching the switch from the initial charging circuit to the stationary charging circuit.

7. A charging method for a plurality of squibs according to claim 1, wherein an amount of electrical power drawn from the bus to the electrical storage device is controlled by the ignition control device based solely on a capacity of the electrical storage device as determined based on the current level is said bus.

8. A charging method for a plurality of squibs according to claim 1, wherein the initial charging circuit of each squib is connected to the bus by the switch during the direction of charging initiation, the electric power supply for charging, and the direction of charging stop for the squib's storage device until a supply of electrical power for the storage device is determined to be completed, and thereafter the switch is operated to disconnect the initial charging circuit and connect the stationary charging circuit of the squib to the bus permitting a further small quantity of electrical power to be drawn by the storage device.

9. A charging method for any multiple number of squibs, each including a storage device and connected to a common ignition control device via a common bus, and wherein each squib is selectively operated by electrical energy and electrical signals from the ignition control device, wherein the method comprises the steps of:

operating the ignition control device to charge the charge storage device of one said squib by carrying out a direction of charging initiation, an electric power supply for charging, and a direction of charging stop; and thereafter successively repeating said charging step for each of the charge storage devices of each of the remaining squibs until the charging for all storage devices is completed;

wherein each squib further includes an initial charging circuit and a stationary charging circuit connected to the bus via a switch which is switched by a signal from the ignition control device; and determining a charged condition of the storage device of each squib solely based on current level in said bus.

10. A charging method for a plurality of squibs according to claim 9, wherein when the ignition control device transmits an electrical signal which implies an ignition initiation to the initial charging circuit for the storage device in each squib via the bus, a path which draws in electrical current from the bus to the storage device of the squib is formed, and an initial charging of the storage device is initiated using electrical power provided from the ignition control device.

11. A charging method for a plurality of squibs according to claim 9, further comprising the steps of: having the ignition control device monitor electrical current which is consumed by the bus; determining that a supply of electrical power for each said squib is completed when an electrical current value of electrical power for the charging initiation of the corresponding charge storage device conforms with an electrical current value of the electrical current which is consumed by the bus before the charging operation is initiated; calculating a time taken for a completion of charging for each said charge storage device; and having the ignition control device determine a capacity of each said charge storage device by computing the capacity from the charging time using a time constant of the charge storage device.

12. A charging method for a plurality of squibs according to claim 9, further comprising the steps of: monitoring electrical current which is consumed by the bus; determining that a supply of electrical power for each said squib is completed when an electrical current value of electrical power for the charging initiation of the corresponding charge storage device conforms with an electrical current value of the electrical current which is consumed by the bus before the charging operation is initiated; notifying the completion of charging to the ignition control device; calculating a time taken for a completion of charging for each said charge storage device; and determining a capacity of the corresponding charge storage device by computing the capacity from the charging time using a time constant of the charge storage device.

13. A charging method for a plurality of squibs according to claim 9, wherein when each electrical signal which implies completion of charging of each storage device is transmitted to the ignition control device via the bus, a completion of charging of each storage device is detected by the ignition control device, while when the ignition control device detects the completion of charging of each storage device, a path which draws in electrical current from the bus to the storage device is blocked, thereby the initial charging is completed, and a supplemental charge from the bus is conducted by switching the switch from the initial charging circuit to the stationary charging circuit.

14. A charging method for a plurality of squibs according to claim 9, further comprising the steps of: having the ignition control device monitor electrical current which is consumed by the bus; determining that a supply of electrical power for each said squib is completed when an electrical current value of electrical power for the charging initiation of the corresponding charge storage device conforms with an electrical current value of the electrical current which is consumed by the bus before the charging operation is initiated; and thereafter blocking a path which draws in electrical current from the bus to the storage device when the initial charging is finished and conducting a supplemental charge from the bus by switching the switch from the initial charging circuit to the stationary charging circuit.

15. A charging method for a plurality of squibs according to claim 9, wherein an amount of electrical power drawn from the bus to the electrical storage device is controlled by the ignition control device based solely on a capacity of the electrical storage device as determined based on the current level is said bus.

16. A charging method for a plurality of squibs according to claim 9, wherein the initial charging circuit of each squib is connected to the bus by the switch during the direction of charging initiation, the electric power supply for charging, and the direction of charging stop for the squib's storage device until a supply of electrical power for the storage device is determined to be completed, and thereafter the switch is operated to disconnect the initial charging circuit and connect the stationary charging circuit of the squib to the bus permitting a further small quantity of electrical power to be drawn by the storage device.

* * * * *